US012300780B2

(12) United States Patent
Uchida et al.

(10) Patent No.: US 12,300,780 B2
(45) Date of Patent: May 13, 2025

(54) ELECTRODE FOR POWER STORAGE DEVICE, AND POWER STORAGE DEVICE

(71) Applicant: NGK Spark Plug Co., LTD., Nagoya (JP)

(72) Inventors: Manato Uchida, Nagoya (JP); Daisuke Shishihara, Nagoya (JP); Hideaki Hikosaka, Nagoya (JP); Hiroshi Yamamoto, Nagoya (JP); Ayako Kondo, Nagoya (JP); Suguru Miyamoto, Nagoya (JP); Hidetoshi Mizutani, Nagoya (JP)

(73) Assignee: NITERRA CO., LTD., Nagoya (JP)

( * ) Notice: Subject to any disclaimer, the term of this patent is extended or adjusted under 35 U.S.C. 154(b) by 590 days.

(21) Appl. No.: 17/636,704

(22) PCT Filed: Jun. 24, 2020

(86) PCT No.: PCT/JP2020/024711
§ 371 (c)(1),
(2) Date: Feb. 18, 2022

(87) PCT Pub. No.: WO2021/033424
PCT Pub. Date: Feb. 25, 2021

(65) Prior Publication Data
US 2022/0294009 A1 Sep. 15, 2022

(30) Foreign Application Priority Data

Aug. 22, 2019 (JP) ................................. 2019-151672

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0077* (2013.01)

(58) Field of Classification Search
CPC ................................................ H01M 10/0562
See application file for complete search history.

(56) References Cited

U.S. PATENT DOCUMENTS

2015/0171463 A1 6/2015 Liang et al.
2016/0365607 A1 12/2016 Yokoyama
(Continued)

FOREIGN PATENT DOCUMENTS

CN 107851840 A * 3/2018 .......... H01M 10/052
DE 102018218486 A1 * 7/2019
(Continued)

OTHER PUBLICATIONS

Japanese Office Action dated Dec. 27, 2022 for the corresponding Japanese Patent Application No. 2021-540649 (8 pages including English translation).
(Continued)

*Primary Examiner* — Amanda C. Walke
(74) *Attorney, Agent, or Firm* — Leason Ellis LLP; Melvin C. Garner; Mitsuhiro Haraguchi

(57) ABSTRACT

To enhance lithium ion conductivity in an electrode for a power storage device, and at the interface between the electrode and another member. The power storage device electrode includes an oxide-based lithium ion conductive solid electrolyte, an active material, and an ionic liquid.

8 Claims, 11 Drawing Sheets

(56) References Cited

U.S. PATENT DOCUMENTS

| | | |
|---|---|---|
| 2017/0062823 A1 | 3/2017 | Yamaguchi et al. |
| 2017/0331080 A1 | 11/2017 | Sasaka |
| 2018/0277891 A1 | 9/2018 | Mimura et al. |
| 2021/0020983 A1 | 1/2021 | Shishihara et al. |
| 2021/0091409 A1 | 3/2021 | Mimura et al. |

FOREIGN PATENT DOCUMENTS

| | | | | |
|---|---|---|---|---|
| EP | 3104432 A1 | | 12/2016 | |
| JP | 2000138073 A | | 5/2000 | |
| JP | 2004183078 A | | 7/2004 | |
| JP | 2013191547 A | | 9/2013 | |
| JP | 2017004705 A | | 1/2017 | |
| JP | 2017050109 A | | 3/2017 | |
| JP | 2018186077 A | * | 11/2018 | ........ H01M 10/0525 |
| JP | 2020038771 A | | 3/2020 | |
| KR | 101953738 B1 | | 3/2019 | |
| WO | 2017099248 A1 | | 6/2017 | |
| WO | WO-2019146216 A1 | * | 8/2019 | ........ H01M 10/0562 |
| WO | 2019221042 A1 | | 11/2019 | |

OTHER PUBLICATIONS

Chinese Office Action mailed Dec. 28, 2023 for the corresponding Chinese Patent Application No. 202080059071.2 (29 pages including English translation).

International Search Report mailed Sep. 15, 2020 for the corresponding International Patent Application No. PCT/JP2020/024711.

Extended European Search Report for the corresponding European Application No. 20855406.3, mailed Jul. 25, 2023 (6 pages).

Chinese Office Action mailed Aug. 24, 2024 for the corresponding Chinese Patent Application No. 202080059071.2 (27 pages including English translation).

* cited by examiner

FIG. 5

| SAMPLE No. | COMPOSITION | | VOLUME RATIO (vol%) | INITIAL DISCHARGE CAPACITY (µAh) | RATING | NOTE |
|---|---|---|---|---|---|---|
| S1 | ACTIVE MATERIAL | NCA | 24.0 | 93 | ○ | |
| | SOLID ELECTROLYTE | LLZ-Mg, Sr | 35.0 | | | |
| | IONIC LIQUID | 1.0M LiFSI (EMI-FSI) | 30.0 | | | |
| | CONDUCTING AID | AB | 1.0 | | | |
| | BINDER | PVDF-HFP | 10.0 | | | |
| S2 | ACTIVE MATERIAL | NCA | 87.0 | 125 | ○ | |
| | SOLID ELECTROLYTE | LLZ-Mg, Sr | 4.0 | | | |
| | IONIC LIQUID | 1.0M LiFSI (EMI-FSI) | 3.0 | | | |
| | CONDUCTING AID | AB | 1.0 | | | |
| | BINDER | PVDF-HFP | 5.0 | | | |
| S3 | ACTIVE MATERIAL | NCA | 66.0 | 323 | ○ | |
| | SOLID ELECTROLYTE | LLZ-Mg, Sr | 3.0 | | | |
| | IONIC LIQUID | 1.0M LiFSI (EMI-FSI) | 18.0 | | | |
| | CONDUCTING AID | AB | 1.0 | | | |
| | BINDER | PVDF-HFP | 12.0 | | | |
| S4 | ACTIVE MATERIAL | NCA | 30.0 | 274 | ○ | |
| | SOLID ELECTROLYTE | LLZ-Mg, Sr | 50.0 | | | |
| | IONIC LIQUID | 1.0M LiFSI (EMI-FSI) | 9.0 | | | |
| | CONDUCTING AID | AB | 1.0 | | | |
| | BINDER | PVDF-HFP | 10.0 | | | |
| S5 | ACTIVE MATERIAL | NCA | 65.0 | 62 | ○ | |
| | SOLID ELECTROLYTE | LLZ-Mg, Sr | 23.5 | | | |
| | IONIC LIQUID | 1.0M LiFSI (EMI-FSI) | 0.5 | | | |
| | CONDUCTING AID | AB | 1.0 | | | |
| | BINDER | PVDF-HFP | 10.0 | | | |

| | | | | | | |
|---|---|---|---|---|---|---|
| S6 | ACTIVE MATERIAL | NCA | 37.0 | — | — | NOT MEASURED DUE TO IONIC LIQUID LEAKAGE IN MOLDING |
| | SOLID ELECTROLYTE | LLZ-Mg, Sr | 10.0 | | | |
| | IONIC LIQUID | 1.0M LiFSI (EMI-FSI) | 40.0 | | | |
| | CONDUCTING AID | AB | 1.0 | | | |
| | BINDER | PVDF-HFP | 12.0 | | | |
| S7 | ACTIVE MATERIAL | NCA | 44.1 | 618 | ○○ | |
| | SOLID ELECTROLYTE | LLZ-Mg, Sr | 30.0 | | | |
| | IONIC LIQUID | 1.0M LiFSI (EMI-FSI) | 14.0 | | | |
| | CONDUCTING AID | VGCF | 0.9 | | | |
| | BINDER | PVDF-HFP | 11.0 | | | |
| S8 | ACTIVE MATERIAL | NCA | 55.0 | 852 | ○○ | |
| | SOLID ELECTROLYTE | LLZ-Mg, Sr | 18.0 | | | |
| | IONIC LIQUID | 1.0M LiFSI (EMI-FSI) | 18.0 | | | |
| | CONDUCTING AID | VGCF | 1.0 | | | |
| | BINDER | PVDF-HFP | 8.0 | | | |

FIG. 6

| SAMPLE No. | COMPOSITION | | VOLUME RATIO (vol%) | INITIAL DISCHARGE CAPACITY (μAh) | RATING | NOTE |
|---|---|---|---|---|---|---|
| S9 | ACTIVE MATERIAL | NCA | 76.0 | 682 | ○○ | |
| | SOLID ELECTROLYTE | LLZ-Mg, Sr | 5.0 | | | |
| | IONIC LIQUID | 1.0M LiFSI (EMI-FSI) | 9.0 | | | |
| | CONDUCTING AID | VGCF | 1.0 | | | |
| | BINDER | PVDF-HFP | 9.0 | | | |
| S10 | ACTIVE MATERIAL | LCO | 43.1 | 479 | ○○ | |
| | SOLID ELECTROLYTE | LLZ-Mg, Sr | 31.7 | | | |
| | IONIC LIQUID | 0.8M LiFSI (EMI-FSI) | 15.3 | | | |
| | CONDUCTING AID | VGCF | 0.8 | | | |
| | BINDER | PVDF-HFP | 9.1 | | | |
| S11 | ACTIVE MATERIAL | NCM | 43.5 | 423 | ○○ | |
| | SOLID ELECTROLYTE | LLZ-Mg, Sr | 37.6 | | | |
| | IONIC LIQUID | 0.8M LiFSI (EMI-FSI) | 18.1 | | | |
| | CONDUCTING AID | AB | 0.8 | | | |
| | BINDER | – | NONE | | | |
| S12 | ACTIVE MATERIAL | NCA | 50.3 | 38 | × | |
| | SOLID ELECTROLYTE | LLZ-Mg, Sr | 36.1 | | | |
| | IONIC LIQUID | – | NONE | | | |
| | CONDUCTING AID | AB | 0.9 | | | |
| | BINDER | PVDF-HFP | 12.7 | | | |

FIG. 7

| SAMPLE No. | COMPOSITION | | VOLUME RATIO (vol%) | INITIAL DISCHARGE CAPACITY (μAh) | RATING | NOTE |
|---|---|---|---|---|---|---|
| S21 | ACTIVE MATERIAL | ARTIFICIAL GRAPHITE | 25.0 | 240 | ○ | |
| | SOLID ELECTROLYTE | LLZ-Mg, Sr | 35.0 | | | |
| | IONIC LIQUID | 1.0M LiFSI (EMI-FSI) | 30.0 | | | |
| | BINDER | PVDF-HFP | 10.0 | | | |
| S22 | ACTIVE MATERIAL | ARTIFICIAL GRAPHITE | 88.0 | 184 | ○ | |
| | SOLID ELECTROLYTE | LLZ-Mg, Sr | 4.0 | | | |
| | IONIC LIQUID | 1.0M LiFSI (EMI-FSI) | 3.0 | | | |
| | BINDER | PVDF-HFP | 5.0 | | | |
| S23 | ACTIVE MATERIAL | ARTIFICIAL GRAPHITE | 67.0 | 342 | ○ | |
| | SOLID ELECTROLYTE | LLZ-Mg, Sr | 3.0 | | | |
| | IONIC LIQUID | 1.0M LiFSI (EMI-FSI) | 20.0 | | | |
| | BINDER | PVDF-HFP | 10.0 | | | |
| S24 | ACTIVE MATERIAL | ARTIFICIAL GRAPHITE | 30.0 | 162 | ○ | |
| | SOLID ELECTROLYTE | LLZ-Mg, Sr | 50.0 | | | |
| | IONIC LIQUID | 1.0M LiFSI (EMI-FSI) | 10.0 | | | |
| | BINDER | PVDF-HFP | 10.0 | | | |
| S25 | ACTIVE MATERIAL | ARTIFICIAL GRAPHITE | 66.0 | 123 | ○ | |
| | SOLID ELECTROLYTE | LLZ-Mg, Sr | 23.5 | | | |
| | IONIC LIQUID | 1.0M LiFSI (EMI-FSI) | 0.5 | | | |
| | BINDER | PVDF-HFP | 10.0 | | | |
| S26 | ACTIVE MATERIAL | ARTIFICIAL GRAPHITE | 40.0 | — | — | NOT MEASURED DUE TO IONIC LIQUID LEAKAGE IN MOLDING |
| | SOLID ELECTROLYTE | LLZ-Mg, Sr | 10.0 | | | |
| | IONIC LIQUID | 1.0M LiFSI (EMI-FSI) | 40.0 | | | |
| | BINDER | PVDF-HFP | 10.0 | | | |
| S27 | ACTIVE MATERIAL | ARTIFICIAL GRAPHITE | 55.3 | 712 | ○○ | |
| | SOLID ELECTROLYTE | LLZ-Mg, Sr | 25.1 | | | |
| | IONIC LIQUID | 1.0M LiFSI (EMI-FSI) | 11.8 | | | |
| | BINDER | PVDF-HFP | 7.8 | | | |
| S28 | ACTIVE MATERIAL | NATURAL GRAPHITE | 54.2 | 604 | ○○ | |
| | SOLID ELECTROLYTE | LLZ-Mg, Sr | 26.1 | | | |
| | IONIC LIQUID | 1.0M LiFSI (EMI-FSI) | 12.3 | | | |
| | BINDER | PVDF-HFP | 7.4 | | | |

FIG. 8

| SAMPLE No. | COMPOSITION | | VOLUME RATIO (vol%) | INITIAL DISCHARGE CAPACITY (μAh) | RATING | NOTE |
|---|---|---|---|---|---|---|
| S29 | ACTIVE MATERIAL | NATURAL GRAPHITE | 40.0 | 474 | ◯◯ | |
| | SOLID ELECTROLYTE | LLZ-Mg, Sr | 40.0 | | | |
| | IONIC LIQUID | 1.0M LiFSI (EMI-FSI) | 15.0 | | | |
| | CONDUCTING AID | VGCF | 1.0 | | | |
| | BINDER | PVDF-HFP | 4.0 | | | |
| S30 | ACTIVE MATERIAL | NATURAL GRAPHITE | 55.0 | 685 | ◯◯ | |
| | SOLID ELECTROLYTE | LLZ-Mg, Sr | 10.0 | | | |
| | IONIC LIQUID | 1.0M LiFSI (EMI-FSI) | 25.0 | | | |
| | CONDUCTING AID | VGCF | 1.0 | | | |
| | BINDER | PVDF-HFP | 9.0 | | | |
| S31 | ACTIVE MATERIAL | ARTIFICIAL GRAPHITE | 59.9 | 526 | ◯◯ | |
| | SOLID ELECTROLYTE | LLZ-Mg, Sr | 27.3 | | | |
| | IONIC LIQUID | 1.0M LiFSI (EMI-FSI) | 12.8 | | | |
| | BINDER | – | NONE | | | |
| S32 | ACTIVE MATERIAL | ARTIFICIAL GRAPHITE | 53.2 | 612 | ◯◯ | |
| | SOLID ELECTROLYTE | LLZ-Mg, Sr | 26.1 | | | |
| | IONIC LIQUID | 1.0M LiFSI (EMI-FSI) | 12.3 | | | |
| | CONDUCTING AID | VGCF | 1.0 | | | |
| | BINDER | PVDF-HFP | 7.4 | | | |
| S33 | ACTIVE MATERIAL | ARTIFICIAL GRAPHITE | 61.8 | 81 | ✕ | |
| | SOLID ELECTROLYTE | LLZ-Mg, Sr | 29.8 | | | |
| | IONIC LIQUID | – | NONE | | | |
| | BINDER | PVDF-HFP | 8.4 | | | |

ELECTRODE FOR POWER STORAGE DEVICE, AND POWER STORAGE DEVICE

CROSS-REFERENCE TO RELATED PATENT APPLICATIONS

This application is a U.S. National Phase Application under 35 U.S.C. § 371 of International Patent Application No. PCT/JP2020/024711 filed on Jun. 24, 2020 and claims the benefit of priority to Japanese Patent Applications No. 2019-151672 filed on Aug. 22, 2019, the contents of all of which are incorporated herein by reference in their entireties. The International Application was published in Japanese on Feb. 25, 2021 as International Publication No. WO 2021/033424 under PCT Article 21(2).

FIELD OF THE INVENTION

The technique disclosed in the present specification relates to an electrode for power storage devices (hereinafter referred to as a "power storage device electrode").

BACKGROUND OF THE INVENTION

In recent years, an increasing demand has arisen for high-performance batteries in association with, for example, prevalence of electronic apparatuses (e.g., personal computers and cellular phones) and electric-powered automobiles, and growing use of natural energy such as sunlight or wind power. In particular, expectations are placed on utilization of a complete-solid lithium ion secondary battery in which all battery elements are formed of a solid (hereinafter the battery may be referred to as a "complete-solid battery"). Such a complete-solid battery is free from, for example, leakage of an organic electrolytic solution or flashing, and thus is safer than a conventional lithium ion secondary battery containing an organic electrolytic solution prepared by dissolution of a lithium salt in an organic solvent. Since the complete-solid battery can be provided with a simple casing, the battery achieves an increase in energy density per unit mass or unit volume.

The solid electrolyte used for forming a solid electrolyte layer of a complete-solid battery is, for example, an oxide-based lithium ion conductive solid electrolyte or a sulfide-based lithium ion conductive solid electrolyte. When in the powder state, the oxide-based lithium ion conductive solid electrolyte has a relatively hard texture. Thus, when the powder is press-molded to provide a molded product (compact) or molded with a binder to form a molded product (sheet), the particle density is low, resulting in low lithium ion conductivity. Through sintering or vapor deposition of a powder of an oxide-based lithium ion conductive solid electrolyte, lithium ion conductivity can increase. However, warpage or deformation occurs by heat treatment, and difficulty is encountered in producing larger scale batteries.

Meanwhile, a sulfide-based lithium ion conductive solid electrolyte has a relatively soft texture when in a powder state. Thus, when the powder is press-molded to provide a molded product (compact) or molded with a binder to form a molded product (sheet), the particle density is high, resulting in high lithium ion conductivity. However, in some cases, the sulfide-based lithium ion conductive solid electrolyte reacts with water present in air to form hydrogen sulfide gas, which is not preferred in terms of safety.

Also, there has been known a technique which can improve both safety and lithium ion conductivity. According to the disclosed technique, a lithium ion conductor is produced by mixing an oxide-based lithium ion conductive solid electrolyte and a sulfide-based lithium ion conductive solid electrolyte (see, for example, US Patent Application Publication No. 2015/0171463).

PRIOR ART DOCUMENT

Patent Document

Patent Document 1: US Patent Application Publication No. 2015/0171463

Problem to be Solved by the Invention

In complete-solid batteries, one conceivable approach for, for example, enhancing lithium ion conductivity of an electrode (encompassing a cathode and/or an anode, hereinafter the same applies throughout the specification) is addition of a lithium ion conductive solid electrolyte to an electrode to which an active material has been added. Similar to the case of the aforementioned solid electrolyte layer, in the case where an oxide-based lithium ion conductive solid electrolyte is added to an electrode as a solid electrolyte, the particle density is low in a press-molded product (compact) or a molded product (sheet) with a binder, resulting in lower lithium ion conductivity. In the case where a sulfide-based lithium ion conductive solid electrolyte is added to an electrode as a solid electrolyte, safety may be unsatisfactory. Meanwhile, when the aforementioned mixture of an oxide-based lithium ion conductive solid electrolyte and a sulfide-based lithium ion conductive solid electrolyte is used as a solid electrolyte added to an electrode, the amount of sulfide-based lithium ion conductive solid electrolyte can be reduced. However, inferior safety attributable to the sulfide-based lithium ion conductive solid electrolyte must be improved.

Such a problem is not limited to an electrode of a complete-solid lithium ion secondary battery, but is common with an electrode of a power storage device.

The present specification discloses a technique capable of solving the aforementioned problems.

SUMMARY OF THE INVENTION

Means for Solving the Problem

The technique disclosed in the present specification can be implemented in, for example, the following modes.

(1) The present specification discloses a power storage device electrode comprising an oxide-based lithium ion conductive solid electrolyte, an active material, and an ionic liquid. The power storage device electrode contains an oxide based lithium ion conductive solid electrolyte potentially generating no toxic gas, instead of a sulfide-based lithium ion conductive solid electrolyte potentially generating a toxic gas. Thus, generation of a toxic gas can be prevented. In addition, the oxide-based lithium ion conductive solid electrolyte is of a material which has resistance to plastic deformation. If firing is not performed, contact between particles is insufficient, thereby failing to attain high lithium ion conductivity. However, the electrode disclosed in the present specification contains, as a lithium ion-conducting component, an ionic liquid which is non-volatile and incombustible and which has flowability. Thus, lithium ion conduction in the electrode and at the interface between the electrode and another member can be promoted by virtue of the ionic liquid. As a result, a power storage device fabricated from the electrode disclosed in the present specification achieves enhanced power storage device performance.

(2) The aforementioned power storage device electrode may have an active material content by volume of 40 vol % or more and 85 vol % or less, an oxide-based lithium ion conductive solid electrolyte content by volume of 5 vol % or more and 40 vol % or less, and an ionic liquid content by volume of 3 vol % or more and 35 vol % or less. According to this technical feature, lithium ion conduction in the electrode and at the interface between the electrode and another member can be effectively promoted. As a result, the performance of a power storage device fabricated from the electrode having such characteristics can be effectively enhanced.

(3) In the aforementioned power storage device electrode, the oxide-based lithium ion conductive solid electrolyte may have a garnet-type crystal structure including at least Li, La, Zr, and O. Such an oxide-based lithium ion conductive solid electrolyte has a potential window wider than that of other oxide-based lithium ion conductive solid electrolytes. Thus, according to the technical feature, the electrode active material can be selected from a wide range of materials, whereby an electrode containing an optimum active material can be fabricated.

(4) The present specification discloses a power storage device comprising a solid electrolyte layer, a cathode, an anode, and a collector member. At least one of the cathode and the anode may be formed of the aforementioned power storage device electrode. According to the power storage device disclosed in the present specification, lithium ion conduction in the electrode and at the interface between the electrode and another member can be promoted, whereby the performance of the power storage device can be enhanced.

The technique disclosed in the present specification can be implemented in various modes; for example, a power storage device electrode, a power storage device including a power storage device electrode, and production methods therefor.

BRIEF DESCRIPTION OF THE DRAWINGS

FIG. 5 is a table showing the results of evaluation of performance of cathode 114.

FIG. 6 is a table showing the results of evaluation of performance of cathode 114.

FIG. 7 is a table showing the results of evaluation of performance of anode 116.

FIG. 8 is a table showing the results of evaluation of performance of anode 116.

DETAILED DESCRIPTION OF THE INVENTION

A. Embodiment

A-1. Structure of Complete-Solid Battery 102

Entire Structure

Figure 1:
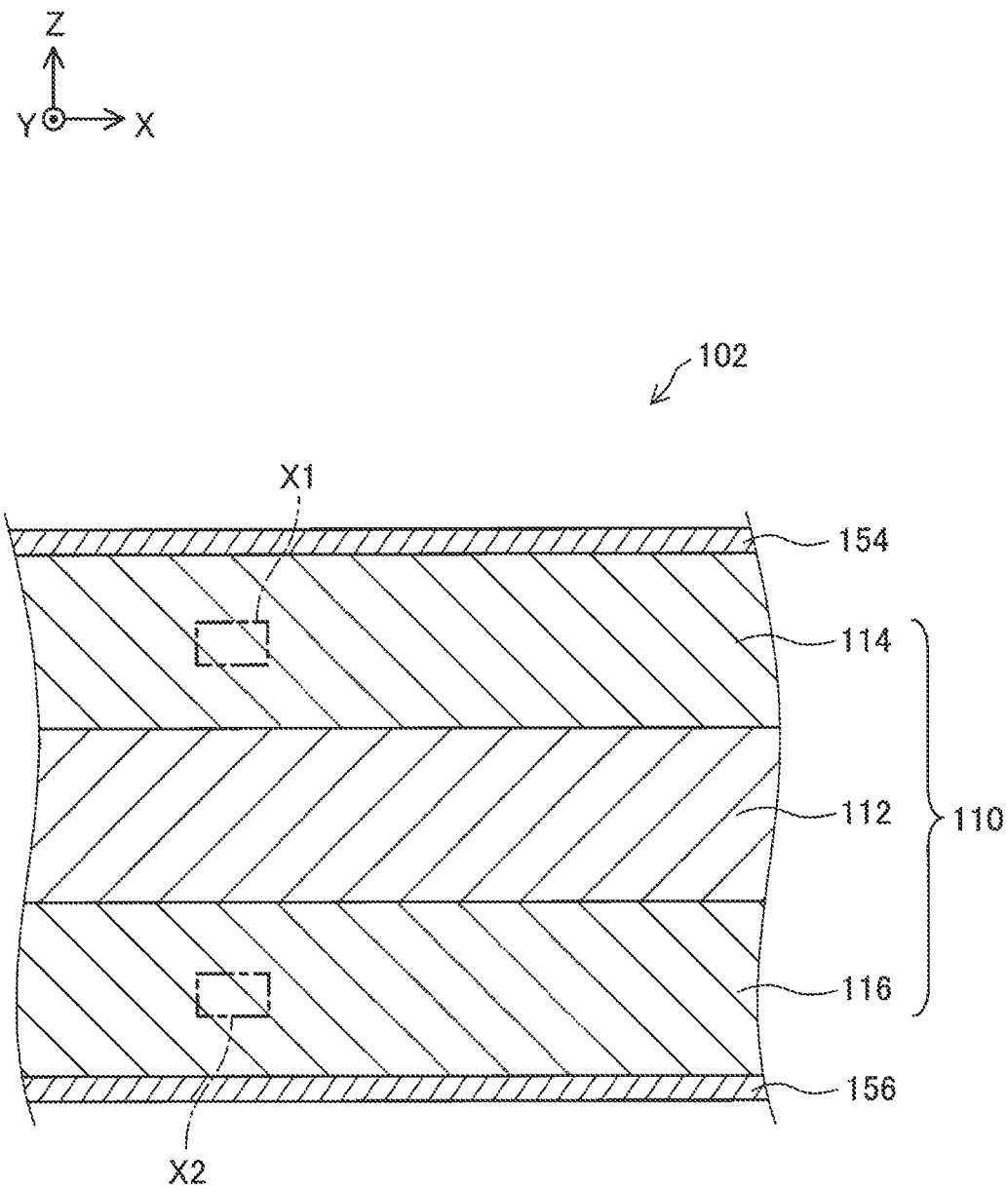
FIG. 1 is an explanatory view schematically showing a cross section of a complete-solid lithium ion secondary battery 102 according to the present embodiment.

FIG. 1 is an explanatory view schematically showing a cross section of a complete-solid lithium ion secondary battery (hereinafter will be referred to as "complete-solid battery") 102 according to the present embodiment. FIG. 1 shows mutually orthogonal X-axis, Y-axis, and Z-axis for specifying respective directions. In the present specification, for the sake of convenience, the positive Z-axis direction is called the "upward direction," and the negative Z-axis direction is called the "downward direction."

The complete-solid battery 102 includes a battery body 110, a cathode-side collector member 154 disposed on one side (upper side) of the battery body 110, and an anode-side collector member 156 disposed on the other side (lower side) of the battery body 110. Each of the cathode-side collector member 154 and the anode-side collector member 156 is an electrically conductive member having a generally flat-plate shape, and is formed of, for example, an electrically conductive metal material selected from among stainless steel, Ni (nickel), Ti (titanium), Fe (iron), Cu (copper), Al (aluminum), and alloys of these, or a carbon material. In the following description, the cathode-side collector member 154 and the anode-side collector member 156 may be collectively referred to as "collector members."

Structure of Battery Body 110

The battery body 110 is a lithium ion secondary battery body in which all battery elements are formed of a solid. As used herein, the phrase "all battery elements are formed of a solid" refers to the case where the skeletons of all battery elements are formed of a solid, but does not exclude the case where, for example, any of the skeletons is impregnated with a liquid. The battery body 110 includes a cathode 114, an anode 116, and a solid electrolyte layer 112 disposed between the cathode 114 and the anode 116. In the following description, the cathode 114 and the anode 116 may be collectively referred to as "electrodes." The term "power storage device" used in CLAIMS encompasses the complete-solid battery 102 and the battery body 110.

Structure of Solid Electrolyte Layer 112

The solid electrolyte layer 112 is a member having a generally flat-plate shape and contains a lithium ion conductive solid electrolyte (for example, the below-mentioned LLZ lithium ion conductive solid electrolyte). The solid electrolyte layer 112 may further contain an ionic liquid having lithium ion conductivity. The solid electrolyte layer 112 may assume a molded product (compact) formed by press-molding a lithium ion conductive solid electrolyte powder, or a molded product (sheet) formed by molding a mixture of a lithium ion conductive solid electrolyte powder with a binder.

Structure of Cathode 114

Figure 2:
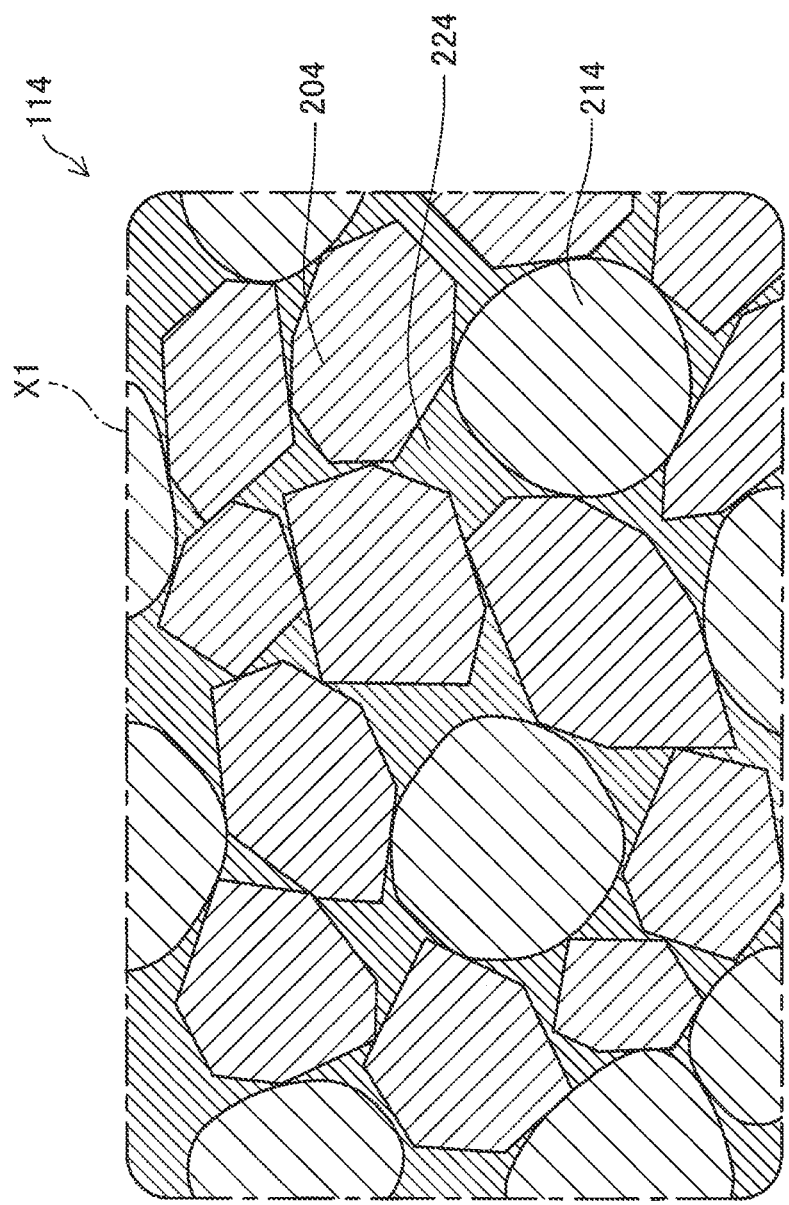
FIG. 2 is an explanatory view schematically showing a part of cathode 114.

The cathode 114 is a member having a generally flat-plate shape. FIG. 2 is an explanatory view schematically showing a part of the cathode 114 (part X1 in FIG. 1). As shown in FIG. 2, the cathode 114 contains a cathode active material 214. The cathode active material 214 is added to the cathode for the purpose of, for example, increasing the amount of lithium ions which are inserted into and released from the cathode 114, to thereby enhance the energy density. The cathode active material 214 used is, for example, S (sulfur), $TiS_2$, $LiCoO_2$ (hereinafter abbreviated as "LCO"), $LiMn_2O_4$, $LiFePO_4$, $Li(Co_{1/3}Ni_{1/3}Mn_{1/3})O_2$ (hereinafter abbreviated as "NCM"), or $LiNi_{0.8}Co_{0.15}Al_{0.05}O_2$ (hereinafter abbreviated as "NCA"). The cathode 114 may further contain an electron-conducting aid (e.g., electrically conductive carbon, Ni (nickel), Pt (platinum), or Ag (silver)).

Also, the cathode 114 contains an ionic liquid 224 having lithium ion conductivity. The ionic liquid 224 is added for the purpose of, for example, lowering the internal resistance of the cathode 114. The ionic liquid 224 having lithium ion conductivity is, for example, an ionic liquid in which a lithium salt is dissolved. Generally, ionic liquid assumes, at ambient temperature, a liquid consisting of only cations and anions, and is a non-volatile and incombustible substance. The material and other aspects of the ionic liquid 224 contained in the cathode 114 will be described in detail hereinbelow.

The cathode 114 contains an oxide-based lithium ion conductive solid electrolyte 204. The oxide-based lithium ion conductive solid electrolyte 204 added for the purpose of, for example, suppressing a drop in lithium ion conductivity of the cathode 114. Another purpose is to reduce the area of a portion of the cathode-side collector member 154 (adjoining the cathode 114) in contact with the ionic liquid 224, to thereby inhibit corrosion of the cathode-side collector member 154. The material and other aspects of the oxide-based lithium ion conductive solid electrolyte 204 contained in the cathode 114 will be described in detail hereinbelow.

Structure of Anode 116

Figure 3:
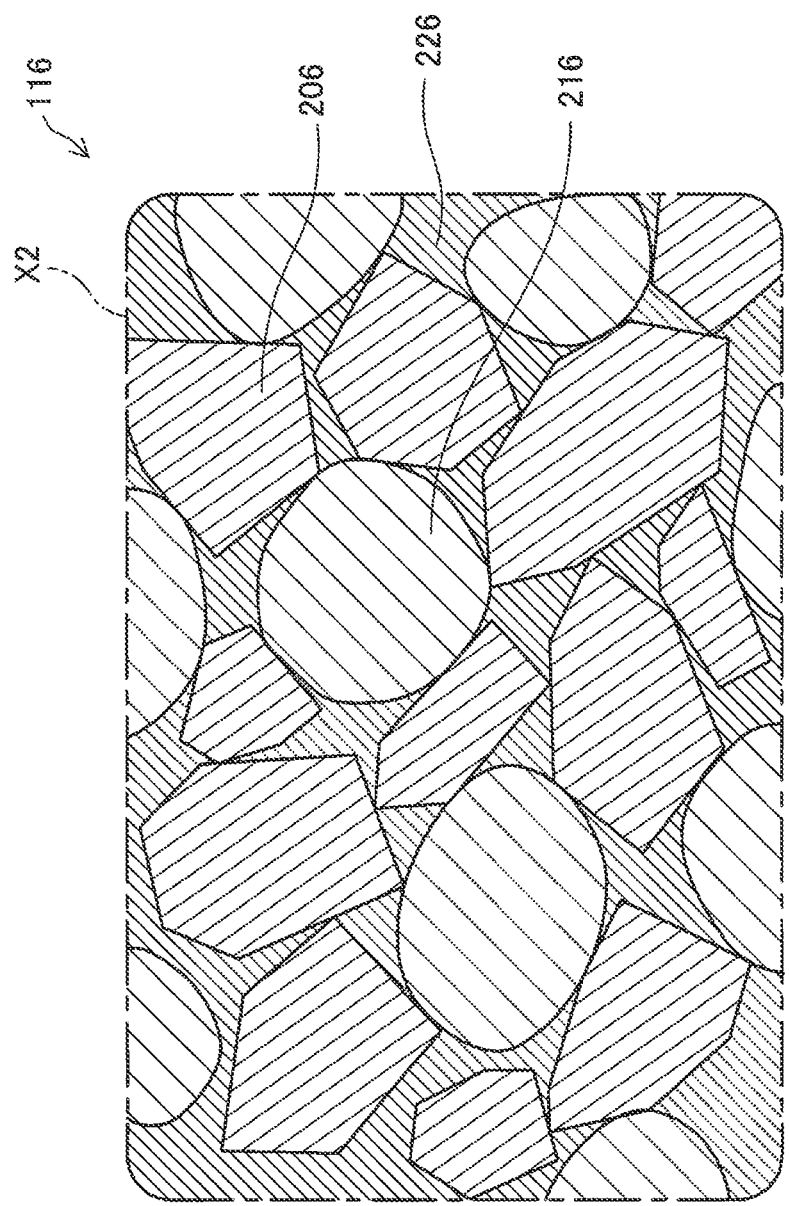
FIG. 3 is an explanatory view schematically showing a part of anode 116.

The anode 116 is a member having a generally flat-plate shape. FIG. 3 is an explanatory view schematically showing a part of the anode 116 (part X2 in FIG. 1). As shown in FIG. 3, the anode 116 contains an anode active material 216. The anode active material 216 is added to the anode for the purpose of, for example, increasing the amount of lithium ions which are inserted into and released from the anode 116, to thereby enhance the energy density. The anode active material 216 is, for example, metallic Li, Li—Al alloy, $Li_4Ti_5O_{12}$ (hereinafter abbreviated as "LTO"), carbon (e.g., graphite, natural graphite, artificial graphite, or core-shell graphite having a surface coating of low-crystallinity carbon), Si (silicon), or SiO. The anode 116 may further contain an electron-conducting aid (e.g., electrically conductive carbon, Ni, Pt, or Ag).

Also, the anode 116 contains an ionic liquid 226 having lithium ion conductivity. The ionic liquid 226 is added for the purpose of, for example, lowering the internal resistance of the anode 116. The ionic liquid 226 having lithium ion conductivity is, for example, an ionic liquid in which a lithium salt is dissolved. The material and other aspects of the ionic liquid 226 contained in the anode 116 will be described in detail hereinbelow.

The anode 116 contains an oxide-based lithium ion conductive solid electrolyte 206. The oxide-based lithium ion conductive solid electrolyte 206 is added for the purpose of, for example, suppressing a drop in lithium ion conductivity of the anode 116. Another purpose is to reduce the area of a portion of the anode-side collector member 156 (adjoining the anode 116) in contact with the ionic liquid 226, to thereby inhibit corrosion of the anode-side collector member 156. The material and other aspects of the oxide-based lithium ion conductive solid electrolyte 206 contained in the anode 116 will be described in detail hereinbelow.

A-2. Detailed Description of Structure of Cathode 114 and Anode 116

Next will be further described in detail the structure of the electrodes (the cathode 114 and the anode 116) serving as elements of a battery body 110. As described above, the cathode 114 contains the cathode active material 214 and the oxide-based lithium ion conductive solid electrolyte 204, and the anode 116 contains the anode active material 216 and the oxide-based lithium ion conductive solid electrolyte 206. The oxide-based lithium ion conductive solid electrolytes 204, 206 used here are, for example, a solid electrolyte having a garnet-type crystal structure which includes at least Li (lithium), La (lanthanum), Zr (zirconium), and O (oxygen). More specifically, there are used, for example, $Li_7La_3Zr_2O_{12}$ (hereinafter abbreviated as "LLZ") and an element-substituted LLZ formed through substitution with Mg (magnesium) and/or at least one element A (A: at least one element selected from the group consisting of Ca (calcium), Sr (strontium), and Ba (barium)) (e.g., a compound formed through element substitution of LLZ with Mg and Sr (hereinafter abbreviated as "LLZ-MgSr")). Hereinafter, these lithium ion conductive solid electrolytes are collectively referred to as an "LLZ lithium ion conductive solid electrolyte" (or an "LLZ ion conductive powder").

Figure 4:
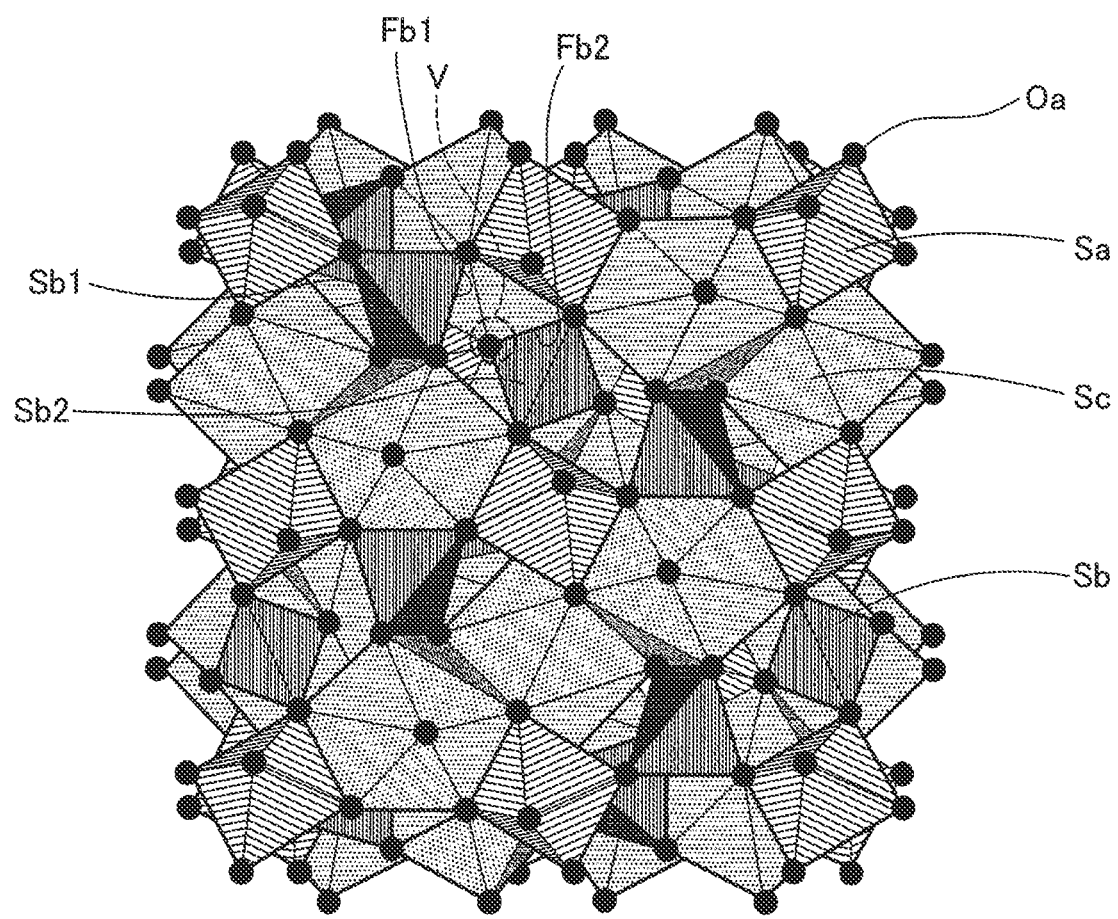
FIG. 4 is an explanatory view schematically showing garnet-type crystal structure.

Meanwhile, the "garnet-type crystal structure" refers to a crystal structure represented by general formula: $C_3A_2B_3O_{12}$. FIG. 4 is an explanatory view schematically showing a garnet-type crystal structure. As shown in FIG. 4, in the garnet-type crystal structure, a C site Sc is dodecahedrally coordinated with oxygen atoms Oa, an A site Sa is octahedrally coordinated with oxygen atoms Oa, and a B site Sb is tetrahedrally coordinated with oxygen atoms Oa. Notably, in the lithium ion conductive powder (lithium ion conductive solid electrolyte) having a garnet-type crystal structure, lithium can be present at a void V, which is octahedrally coordinated with oxygen atoms Oa in a common garnet-type crystal structure. The void V intervenes between, for example, B sites Sb1 and Sb2 shown in FIG. 4. Lithium present in a void V is octahedrally coordinated with oxygen atoms Oa forming an octahedron including a face Fb1 of a tetrahedron forming the B site Sb1 and a face Fb2 of a tetrahedron forming the B site Sb2. In the lithium ion conductive powder (lithium ion conductive solid electrolyte) having, for example, a garnet-type crystal structure with a composition $Li_7La_3Zr_2O_{12}$, the C site Sc can be occupied by lanthanum, the A site Sa can be occupied by zirconium, and the B site Sb and the void V can be occupied by lithium.

The garnet-type crystal structure including at least Li, La, Zr, and O of the lithium ion conductive solid electrolyte (lithium ion conductive powder) can be confirmed through analysis by means of an X-ray diffractometer (XRD). Specifically, the lithium ion conductive solid electrolyte is analyzed by means of an X-ray diffractometer, to thereby obtain an X-ray diffraction pattern. The thus-obtained X-ray diffraction pattern is compared with ICDD (International Center for Diffraction Data) card (01-080-4947) ($Li_7La_3Zr_2O_{12}$) corresponding to LLZ. When the diffraction angle and diffraction intensity ratio of the diffraction peak in the X-ray diffraction pattern are generally consistent with those in the ICDD card, the lithium ion conductive solid electrolyte can be determined to have a garnet-type crystal structure including at least Li, La, Zr, and O. For example, in the case of each lithium ion conductive powder described in "A-7. Preferred embodiment of LLZ ion conductive powder" below, the diffraction angle and diffraction intensity ratio of the diffraction peak in the X-ray diffraction pattern obtained from the corresponding lithium ion conductive powder are generally consistent with those in the ICDD card corresponding to LLZ. Thus, the lithium ion conductive powder is determined to have a garnet-type crystal structure including at least Li, La, Zr, and O.

As the oxide-based lithium ion conductive solid electrolytes 204, 206, solid electrolyte other than the aforementioned LLZ lithium ion conductive solid electrolyte (e.g., any of the following electrolytes) may be used. Examples include the following solid electrolytes:

(1) a solid electrolyte having a NASICON-type crystal structure including at least Li, M (M: at least one of Ti, Zr, and Ge (germanium)), P (phosphorus), and O (e.g., (Li, Ti, Al)(PO$_4$)$_3$, LiZr$_2$(PO$_4$)$_3$, or (Li, Ge, Al)(PO$_4$)$_3$);

(2) a solid electrolyte having a perovskite-type crystal structure including at least Li, Ti, La, and O (e.g., (La,Li)TiO$_3$);

(3) a solid electrolyte having an anti-perovskite type crystal structure including at least Li, Cl, and O (e.g., Li$_2$(OH)Cl); and (4) a complex hydride.

Meanwhile, the oxide-based lithium conductive solid electrolytes 204, 206 contained in the electrodes (cathode 114 and anode 116) preferably have a mean particle size of 0.1 µm or more and 10 µm or less.

Also, as mentioned above, the cathode 114 contains the ionic liquid 224 in which a lithium salt is dissolved, and the anode 116 contains the ionic liquid 226 in which a lithium salt is dissolved. Examples of the lithium salt include lithium tetrafluoroborate (LiBF$_4$), lithium hexafluorophosphate (LiPF$_6$), lithium perchlorate (LiClO$_4$), lithium trifluoromethanesulfonate (CF$_3$SO$_3$Li), lithium bis(trifluoromethanesulfonyl)imide (LiN(SO$_2$CF$_3$)$_2$) (hereinafter referred to as "Li-TFSI"), lithium bis(fluorosulfonyl)imide (LiN(SO$_2$F)$_2$) (hereinafter referred to as "Li-FSI"), and lithium bis (pentafluoroethanesulfonyl)imide (LiN(SO$_2$C$_2$F$_5$)$_2$).

As the aforementioned ionic liquid, there may be used ionic liquids each including a cation selected from the following:

ammonium cations such as butyltrimethylammonium and trimethylpropylammonium;

imidazolium cations such as 1-ethyl-3-methylimidazolium and 1-butyl-3-methylimidazolium;

piperidinium cations such as 1-butyl-1-methylpiperidinium and 1-methyl-1-propylpiperidinium;

pyridinium cations such as 1-butyl-4-methylpyridinium and 1-ethylpyridinium;

pyrrolidinium cations such as 1-butyl-1-methylpyrrolidinium and 1-methyl-1-propylpyrrolidinium;

sulfonium cations such as trimethylsulfonium and triethylsulfonium;

phosphonium cations; and morpholinium cations.

As the aforementioned ionic liquid, there may be used ionic liquids each including an anion selected from the following:

halide anions such as Cl$^-$ and Br$^-$;

borate anions such as BF$_4^-$;

amine anions such as (NC)$_2$N$^-$, (CF$_3$SO$_2$)$_2$N$^-$, and (FSO$_2$)$_2$N$^-$; sulfate and sulfonate anions such as CH$_3$SO$_4^-$ and CF$_3$SO$_3^-$; and phosphate anions such as PF$_6^-$.

More specifically, examples of the aforementioned ionic liquid used includes butyltrimethylammonium bis(trifluoromethanesulfonyl)imide, trimethylpropylammonium bis (trifluoromethanesulfonyl)imide, 1-ethyl-3-methylimidazolium bis(fluorosulfonyl)imide (hereinafter referred to as "EMI-FSI"), 1-ethyl-3-methylimidazolium tetrafluoroborate, 1-methyl-1-propylpyrrolidinium bis(trifluoromethanesulfonyl)imide, 1-methyl-1-propylpyrrolidinium bis(fluorosulfonylimide) (hereinafter referred to as "P13-FSI"), and 1-methyl-1-propylpiperidinium bis(fluorosulfonyl)imide (hereinafter referred to as "PP13-FSI").

Meanwhile, the electrodes (cathode 114 and anode 116) of the present embodiment are not sintered bodies formed through firing at high temperature. Thus, the electrodes of the present embodiment contain hydrocarbon. More specifically, the ion liquid forming the electrodes of the present embodiment contains hydrocarbon. The presence of hydrocarbon contained in the electrodes (ionic liquid) can be determined through one technique selected from, for example, NMR (nuclear magnetic resonance), Raman spectrometry, LC-MS (liquid chromatography-mass spectrometry, GC-MS (gas chromatography-mass spectrometry), and FT-IR (Fourier-transform infrared spectroscopy), or a combination of two or more of these techniques.

As described above, the electrodes (cathode 114 and anode 116) of the present embodiment contain the ionic liquids having lithium ion conductivity 224, 226, in addition to the oxide-based lithium ion conductive solid electrolytes 204, 206 and the active materials (cathode active material 214 and anode active material 216). Thus, the electrodes have high lithium ion conductivity in a state of a molded body formed through press molding (compact). Thus, the performance of the battery body 110 can be enhanced by use of the electrodes of the embodiment. Notably, the reason why the electrodes of the present embodiment exhibit such a high lithium ion conductivity has not been clearly elucidated, but is assumed as follows.

Generally, oxide-based lithium ion conductive solid electrolytes have a texture harder than that of a non-oxide-based lithium ion conductive solid electrolyte (e.g., a sulfide-based lithium ion conductive solid electrolyte). Thus, when a powder of such an oxide-based lithium ion conductive solid electrolyte is formed into a molded product (compact) through press molding, the compact exhibits relatively low lithium ion conductivity, since particles are in point contact with one another, and the resistance between particles is high. Although the lithium ion conductivity can be elevated by firing the oxide-based lithium ion conductive solid electrolyte powder at a high temperature, difficulty is encountered in producing a large-size battery, since high-temperature firing of the powder causes warpage or deformation. Also, high-temperature firing of the powder may cause reaction of the powder with, for example, an electrode active material to form a layer of high resistance, possibly leading to a reduction in lithium ion conductivity. However, the electrodes (cathode 114 and anode 116) of the present embodiment contain the ionic liquids having lithium ion conductivity 224, 226, in addition to the oxide-based lithium ion conductive solid electrolytes 204, 206. As shown in FIGS. 2 and 3, the ionic liquids 224, 226 exist so as to surround particles of the oxide-based lithium ion conduct solid electrolytes 204, 206, respectively. Therefore, conceivably, in a molded body formed through press molding, the ionic liquids 224, 226 serving as lithium ion conduction paths are present at the particle boundaries of the oxide-based lithium ion conductive solid electrolytes 204, 206, to thereby enhance lithium ion conductivity at the particle boundaries, leading to an enhancement in lithium ion conductivity the electrodes and at the interface between any of the electrodes and another member (e.g., the solid electrolyte layer 112).

The electrodes (cathode 114 and anode 116) of the present embodiment may contain a binder, in addition to the oxide-based lithium ion conductive solid electrolytes 204, 206, the active materials (cathode active material 214 and anode active material 216), and the ionic liquids 224, 226. The electrodes may be formed into the form of sheet.

Examples of the binder employed here include polyvinylidene fluoride (PVDF), a copolymer of polyvinylidene fluoride (PVDF) and hexafluoropropylene (HFP) (hereinafter the copolymer will be referred to as "PVDF-HFP"), polytetrafluoroethylene (PTFE), polyimide, polyamide, silicone (polysiloxane), styrene-butadiene rubber (SBR), acrylic resin (PMMA), and polyethylene oxide (PEO). According to such a technical feature, formability and handling property of the electrodes can be enhanced, with an improvement of lithium ion conductivity of the electrodes.

In the present embodiment, the amount of the active material (cathode active material 214 or anode active material 216) contained in the electrode (cathode 114 or anode 116) is preferably 40 vol % or more and 85 vol % or less. When the electrode has excessively low active material content by volume, capacity of the corresponding battery cannot be fully secured, whereas when the electrode has excessively high active material content by volume, the internal resistance of the electrode cannot be effectively reduced. More preferably, the active material content by volume of the electrode is 40 vol % or more and 70 vol % or less.

Also, the amount of the oxide-based lithium ion conductive solid electrolyte 204 or 206 contained in the electrode (cathode 114 or anode 116) preferably 5 vol % or more and 40 vol % or less. When the amount of the oxide-based lithium ion conductive solid electrolyte 204 or 206 contained in the corresponding electrode is excessively small, a drop in lithium ion conductivity of the electrode cannot be suppressed, and corrosion of the collector member cannot be effectively suppressed. When the amount of the oxide-based lithium ion conductive solid electrolyte 204 or 206 contained in the corresponding electrode is excessively large, the internal resistance of the electrode cannot be effectively reduced. The amount of the oxide-based lithium ion conductive solid electrolyte 204 or 206 contained in the corresponding electrode is more preferably 10 vol % or more and 40 vol % or less, still more preferably 20 vol % or more and 40 vol % or less.

Preferably, the amount of the ionic liquid 224 or 226 contained in the electrode (cathode 114 or anode 116) is 3 vol % or more and 35 vol % or less. When the amount of the ionic liquid 224 or 226 contained in the corresponding electrode is excessively small, the internal resistance of the electrode cannot be effectively reduced, whereas when the amount of the ionic liquid 224 or 226 contained in the corresponding electrode is excessively large, the ionic liquid may leak out. More preferably, the amount of the ionic liquid 224 or 226 contained in the corresponding electrode is 10 vol % or more and 25 vol % or less.

In the electrode (cathode 114 or anode 116), when the amount of the active material (cathode active material 214 or anode active material 216) is adjusted to 40 vol % or more and 85 vol % or less; the amount of the oxide based lithium ion conductive solid electrolyte 204 or 206 is adjusted to 5 vol % or more and 40 vol % or less; and the amount of the ionic liquid 224 or 226 is adjusted to 3 vol % or more and 35 vol % or less, lithium ion conductivity in the electrode and at the interface between the electrode and another member (e.g., solid electrolyte layer 112) can be effectively enhanced, while corrosion of the collector member and leakage of the ionic liquid are suppressed. As a result, the performance of the battery body 110 employing the electrode can be effectively enhanced.

A-3. Method for Producing Complete-Solid Battery 102

Next will be described an exemplary production method for the complete-solid battery 102 of the present embodiment. Firstly, the solid electrolyte layer 112 is formed. Specifically, powder of an oxide-based lithium ion conductive solid electrolyte and an ionic liquid are mixed together. The thus-prepared mixture is press-molded at a predetermined pressure, or molded into a sheet by use of a binder, to thereby produce the solid electrolyte layer 112.

Separately, the cathode 114 and the anode 116 are fabricated. In a specific procedure, powder of the oxide-based lithium ion conductive solid electrolyte 204 is mixed with the ionic liquid 224, to thereby provide a mixture. Then, powder of the cathode active material 214 (or in the case of using an electron-conducting aid, a mixture of the cathode active material 214 powder and the electron-conducting aid) is added to the above mixture, followed by further mixing. The resultant mixture is press-molded at a predetermined pressure, or molded into a sheet with a binder, to thereby form the cathode 114. In a similar manner, powder of the oxide-based lithium ion conductive solid electrolyte 206 is mixed with the ionic liquid 226, to thereby provide a mixture. Then, powder of the anode active material 216 (or in the case of using an electron-conducting aid, a mixture of the anode active material 216 powder and the electron-conducting aid) is added to the above mixture, followed by further mixing. The resultant mixture is press-molded at a predetermined pressure, or molded into a sheet with a binder, to thereby form the anode 116.

Subsequently, the cathode-side collector member 154, the cathode 114, the solid electrolyte layer 112, the anode 116, and the anode-side collector member 156 are stacked in this order, and then integrated together through pressing. Through the above-described process, the complete-solid battery 102 having the aforementioned structure is produced.

A-4. Effects Provided by the Present Embodiment

As described above, the electrodes (cathode 114 and anode 116) of the present embodiment for the battery body 110 contain the oxide-based lithium ion conductive solid electrolytes 204, 206, the active materials (cathode active material 214 and anode active material 216), and ionic liquids 224, 226. Thus, the electrodes (cathode 114 and anode 116) of the present embodiment contain the oxide-based lithium ion conductive solid electrolytes 204, 206, which potentially generate no toxic gas, instead of a sulfide-based lithium ion conductive solid electrolyte potentially generating a toxic gas. As a result, generation of a toxic gas can be prevented. In addition, the oxide-based lithium ion conductive solid electrolytes 204, 206 are of a material which has resistance to plastic deformation. If firing is not performed, contact between particles is insufficient, thereby failing to attain high lithium ion conductivity. However, the electrodes (cathode 114 and anode 116) of the present embodiment contain, as a lithium ion-conducting component, ionic liquids 224, 226 which are non-volatile and incombustible and which have flowability. Thus, lithium ion conduction in the electrodes and at the interface between any of the electrodes and another member (e.g., solid electrolyte layer 112) can be promoted. As a result, the performance of the battery body 110 fabricated from the electrodes of the present embodiment can be enhanced.

Since the electrodes (cathode 114 and anode 116) of the present embodiment contain the oxide-based lithium ion conductive solid electrolytes 204, 206, the area of a portion of the collector member (cathode-side collector member 154 or anode-side collector member 156, adjoining the cathode or anode) in contact with the ionic liquid 224 or 226 can be reduced, as compared with the case where no oxide-based lithium ion conductive solid electrolyte 204 or 206 is contained. As a result, corrosion of the collector members can be inhibited. As described above, when the lithium salt concentration of the ionic liquid 224 or 226 is high (specifically 0.4 mol/L or higher), corrosion of the collector members tends to occur. Thus, through incorporation of the oxide-based lithium ion conductive solid electrolyte 204 or 206, corrosion inhibiting effect on the collector member becomes more beneficial.

In the electrodes (cathode 114 and anode 116), preferably, the amount of the active material (cathode active material 214 or anode active material 216) is 40 vol % or more and 85 vol % or less; the amount of the oxide-based lithium ion conductive solid electrolyte 204 or 206 is 5 vol % or more and 40 vol % or less; and the amount of the ionic liquid 224 or 226 is 3 vol % or more and 35 vol % or less. According to this technical feature, lithium ion conductivity in any of the electrodes and at the interface between any of the electrodes and another member (e.g., the solid electrolyte layer 112) can be effectively enhanced. As a result, the performance of the battery body 110 employing the electrodes can be effectively enhanced.

The A power storage device electrode 204 or 206 contained in the electrode (cathode 114 or anode 116) is preferably a solid electrolyte having a garnet-type crystal structure including at least Li, La, Zr, and O (i.e., an LLZ lithium ion conductive solid electrolyte). Since the LLZ lithium ion conductive solid electrolyte has a potential window wider than that of other oxide-based lithium ion conductive solid electrolytes, the electrode active materials (cathode active material 214 and anode active material 216) can be selected from a wide range of materials, whereby electrodes containing an optimum active material can be fabricated. Examples of the cathode active material include LCO, $LiMn_2O_4$, $LiFePO_4$, NCM, and NCA. Examples of the anode active material include metallic lithium, Li—Al alloy, LTO, carbon (e.g., graphite, natural graphite, artificial graphite, or core-shell graphite having a surface coating of low-crystallinity carbon), Si (silicon), and SiO.

A-5. Determination of Composition of Electrode (Component Content by Volume)

The component content (by volume (vol %)) of the electrode (cathode 114 or anode 116) forming the battery body 110 is determined through the following procedure. The target components are active material (cathode active material 214 and anode active material 216), oxide-based lithium ion conductive solid electrolytes 204 and 206, and ionic liquids 224 and 226.

Specifically, an electrode material mixture to be analyzed is added to a solvent (e.g., chloroform) for dissolution, whereby the mixture is separated into a dissolution phase (containing a binder and an ionic liquid) and a precipitate phase (an active material, an oxide-based lithium ion conductive solid electrolyte, and an electron-conducting aid). The dissolved matter is analyzed through LC-MS (liquid chromatography-mass spectrometry) for qualitatively determining the material components (ionic liquid and binder), whereby the binder and the ionic liquid are identified. In addition, a calibration curve is provided for each material component, and the amount of each component contained in the dissolution phase is determined on the basis of the calibration curve.

In analysis of the precipitate phase, the weight of the entire precipitated matter is measured. Also, the precipitated matter is analyzed through XRD measurement (X-ray analysis), to thereby determine the chemical composition, whereby the material components; i.e., the active material and the oxide-based lithium ion conductive solid electrolyte, are identified. In addition, the precipitated matter is analyzed through XRF measurement (fluorescence X-ray analysis), to thereby determine compositional proportions of the material components. Thus, the proportions among the active material, the oxide-based lithium ion conductive solid electrolyte, and the electron-conducting aid are determined. Finally, the active material content and the oxide-based lithium ion conductive solid electrolyte content are determined from the weight of the entire precipitated material and the proportions among the active material, the oxide-based lithium ion conductive solid electrolyte, and the electron-conducting aid.

Based on the thus-calculated component contents (binder, ionic liquid, active material, and oxide-based lithium ion conductive solid electrolyte), the volume ratio of each component (content by volume (%)) is determined.

Notably, the volume ratio of the active material and that of the oxide-based lithium ion conductive solid electrolyte may also be determined through the following method. Specifically, an electrode to be analyzed is frozen by use of liquid nitrogen or the like in order to attain a state in which each substance is immobilized. The frozen product is processed through a CP method (i.e., cross section polisher technique), to thereby provide cross sections to be analyzed. Each cross section is subjected to element mapping through EDS (energy dispersive X-ray spectrometry), to thereby determine the volume ratio of the active material and that of the oxide-based lithium ion conductive solid electrolyte.

A-6. Performance Evaluation

Figure 9:
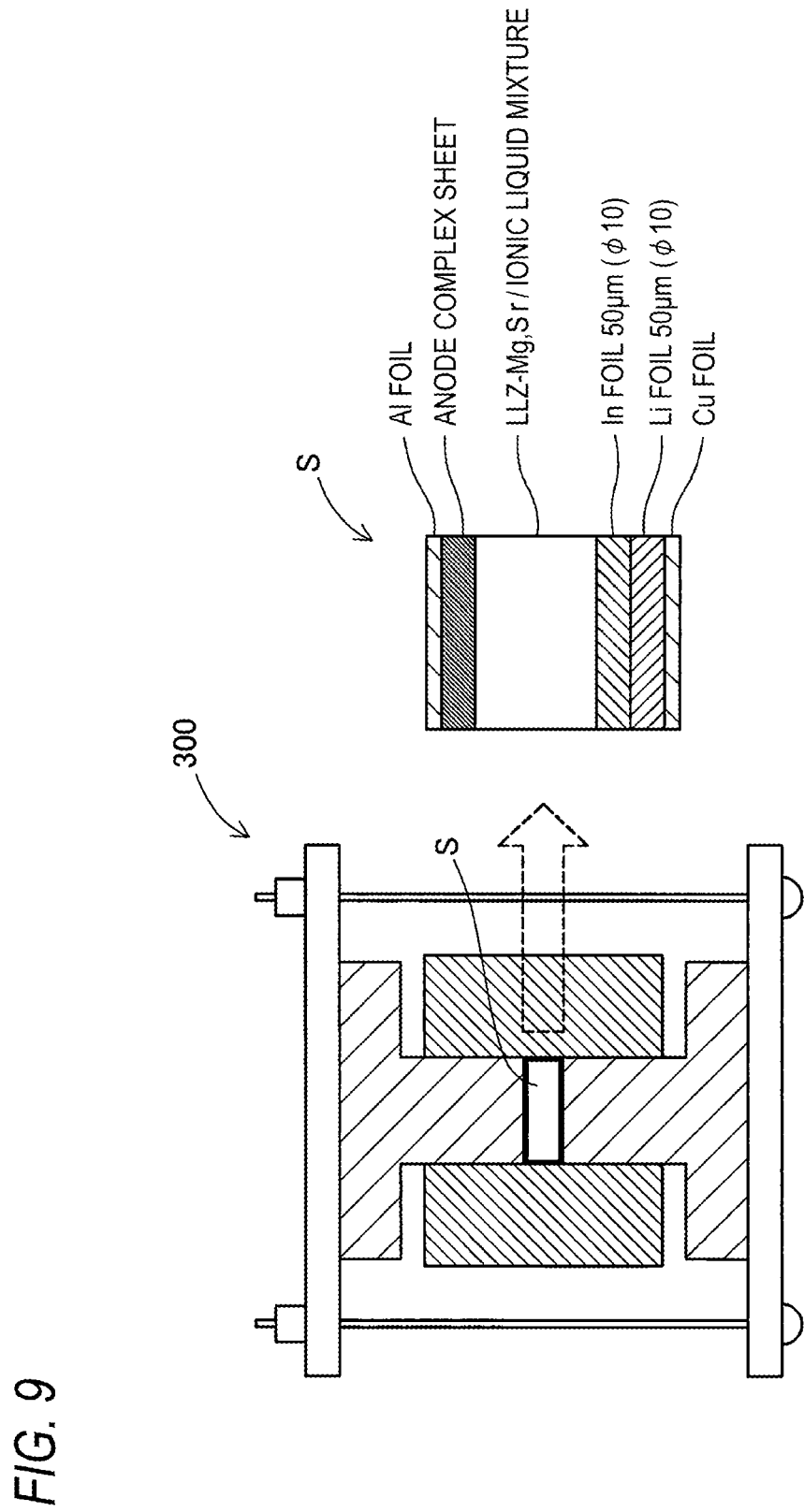
FIG. 9 is an explanatory view schematically showing structures of pressure jig 300 and sample S used in performance evaluation of cathode 114.
Figure 10:
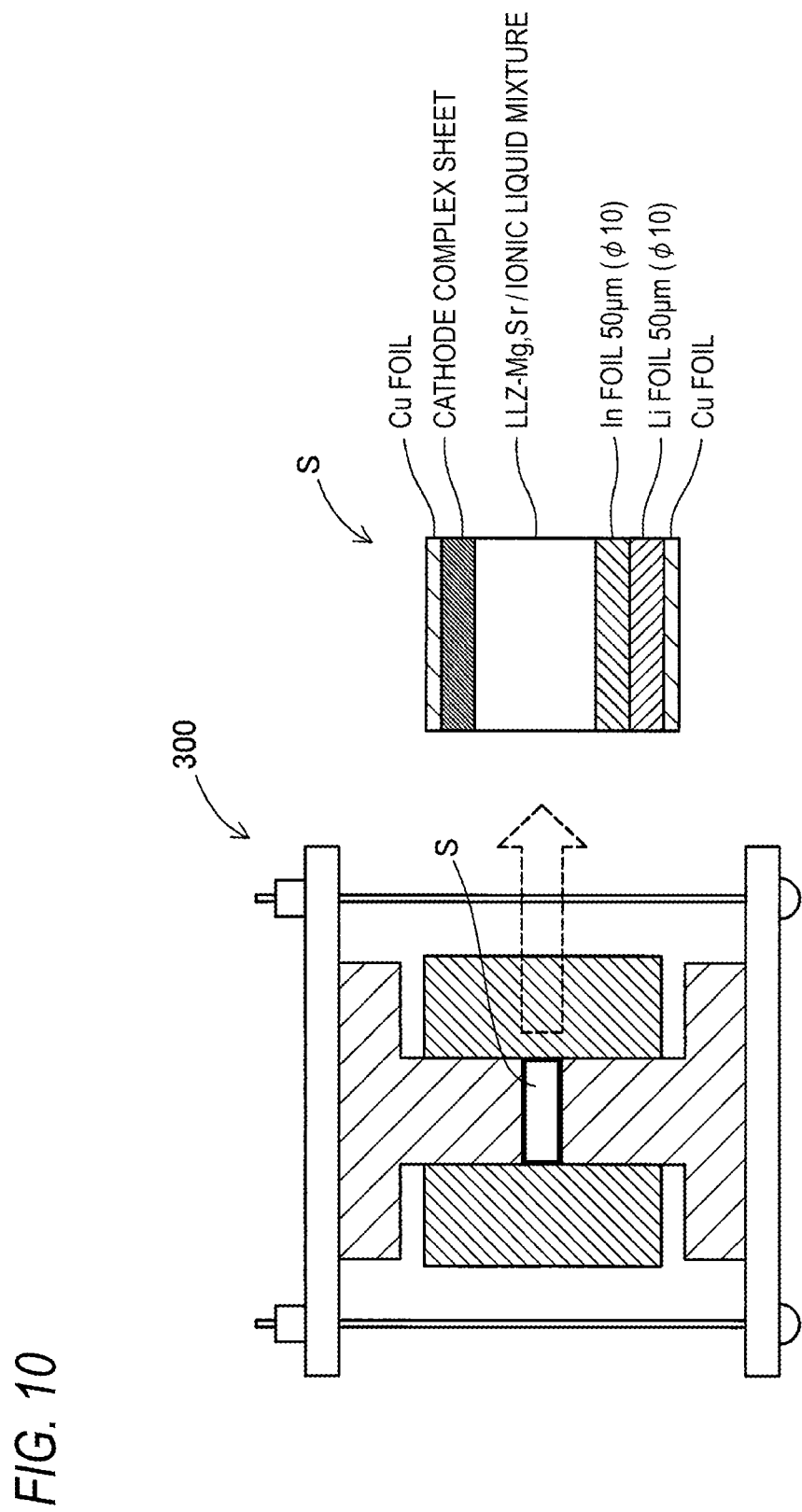
FIG. 10 is an explanatory view schematically showing structures of pressure jig 300 and sample S used in performance evaluation of anode 116.

Performance of the electrodes of the battery body 110 (cathode 114 and anode 116) were evaluated. FIGS. 5 and 6 are tables showing the results of evaluation of performance of the cathode FIGS. 7 and 8 are tables showing the results of evaluation of performance of the anode 116. FIG. 9 is an explanatory view schematically showing structures of a pressure 300 and a sample S used in evaluation of the cathode 114. FIG. 10 is an explanatory view schematically showing structures of the pressure jig 300 and a sample S used in evaluation of the anode 116.

As shown in FIGS. 5 and 6, the performance of the cathode 114 was evaluated by use of 12 samples (S1 to S12). As shown in FIGS. 7 and 8, the performance of the anode 116 was evaluated by use of 13 samples (S21 to S33). These samples for evaluating the cathode 114 and the anode 116 have compositions (i.e., material and volume content of each component) different from one another.

As shown in FIGS. 5 and 6, each of the samples S1 to S10 for evaluating the cathode 114 is a sheet-form molded product containing the cathode active material 214, the oxide-based lithium ion conductive solid electrolyte 204, the ionic liquid 224, an electron-conducting aid, and a binder. The sample S11 is a compact containing the cathode active material 214, the oxide-based lithium ion conductive solid electrolyte 204, the ionic liquid 224, and an electron-conducting aid, but containing no binder. Being different from the other samples, the sample S12 is a sheet-form molded product containing the cathode active material 214, the oxide-based lithium ion conductive solid electrolyte 204, an electron-conducting aid, and a binder, but containing no ionic liquid 224.

In the samples S1 to S9, and S12, NCA ($LiNi_{0.8}Co_{0.15}Al_{0.05}O_2$) was used as the cathode active material 214. In the sample S10, the aforementioned LCO ($LiCoO_2$) was used. In the sample S11, the aforementioned NCM($Li(Co_{1/3}Ni_{1/3}Mn_{1/3})O_2$) was used. In all the samples, the aforementioned LLZ-Mg, Sr was used as the oxide-based lithium ion conductive solid electrolyte 204. In the samples S1 to S9, the aforementioned ionic liquid EMI-FSI containing a lithium salt Li-FSI dissolved therein (hereinafter referred to as "Li-FSI(EMI-FSI)", lithium salt concentration: 1.0M (=mol/L)) was used as the ionic liquid 224. In the samples S10 and S11, the aforementioned ionic liquid EMI-FSI containing a lithium salt Li-TESI dissolved therein (hereinafter referred to as "Li-TFSI(EMI-FSI)", lithium salt concentration: 0.8M (=mol/L)) was used. As the electron-conducting aid, acetylene black (AB) was used in the samples S1 to S6, S11, and S12, and vapor phase grown carbon fiber (VGCF) was used in the samples S7 to S10. As the binder, the aforementioned PVDF-HFP was used in the samples (S1 to S10, and S12), each containing a binder.

Also, as shown in FIGS. 7 and 8, each of the samples S21 to S30, and S32 for evaluating the anode 116 is a sheet-form molded product containing the anode active material 216, the oxide-based lithium ion conductive solid electrolyte 206, the ionic liquid 226, and a binder. The samples S29, S30, and S32 further contain an electron-conducting aid (VGCF). The sample S31 is a compact containing the anode active material 216, the oxide-based lithium ion conductive solid electrolyte 206, and the ionic liquid 226, but containing no binder. Being different from the other samples, the sample S33 is a sheet-form molded product containing the anode active material 216, the oxide-based lithium ion conductive solid electrolyte 206, and a binder, but containing no ionic liquid 226.

In the samples S21 to S27, and S31 to S33, artificial graphite (MCMB) was used as the anode active material 216. In the samples S28 to S30, the natural graphite was used. In all the samples, the aforementioned LLZ-Mg, Sr was used as the oxide-based lithium ion conductive solid electrolyte 206. As the ionic liquid 226, 1.0M Li-ESI (EMI-FSI) was used in the samples (S21 to S32), each containing the ionic liquid 226. As the binder, the aforementioned PVDF-HFP was used in the samples (S21 to S30, S32, and S33), each containing a binder.

The samples were prepared through the following procedure, and discharge capacity of each sample was measured. Firstly, an LLZ-MgSr powder serving as the oxide-based lithium ion conductive solid electrolyte was prepared through the following procedure. Specifically, $Li_2CO_3$, MgO, $La(OH)_3$, $SrCO_3$, and $ZrO_2$ were weighed so as to achieve a composition of $Li_{6.95}Mg_{0.15}La_{2.75}Sr_{0.25}Zr_{2.0}O_{12}$ (LLZ-MgSr). In consideration of volatilization of Li during firing, $Li_2CO_3$ was further added so that the amount of elemental Li was in excess by about 15 mol %. These raw materials were added to a nylon pot together with zirconia balls, and the resultant mixture was pulverized by means of a ball mill in an organic solvent for 15 hours. Thereafter, the resultant slurry was dried and then calcined on an MgO plate at 1,100° C. for 10 hours. A binder was added to the calcined powder, and the mixture was subjected to pulverization by means of a ball mill in an organic solvent for 15 hours. Thereafter, the resultant slurry was dried, and the dried material was added to a mold having a diameter of 12 mm. The material was press-molded so as to have a thickness of about 1.5 mm, and was further pressed at an isostatic pressure of 1.5 t/cm² by means of a cold isostatic pressing (CIP) machine, to thereby form a molded product. The molded product was covered with a calcination powder having the same composition as that of the molded product and fired in a reducing atmosphere at 1,100° C. for 4 hours, to thereby yield a sintered body. The sintered body was pulverized in a glove box under argon, to thereby prepare an LLZ-MgSr powder. The LLZ-MgSr powder was found to have a particle size of about 0.3 to about 0.8 μm.

To the thus-prepared oxide-based lithium ion conductive solid electrolyte (LLZ-MgSr) powder, an ionic liquid predetermined for a corresponding sample was added, and the mixture was mixed by means of a mortar, to thereby prepare a mixture of a solid electrolyte and an ionic liquid. For the production of the cathode 114, the cathode active material 214 and an electron-conducting aid predetermined for a corresponding sample were added, and the mixture was mixed by means of a mortar. The resultant mixture was added to and mixed with the aforementioned mixture of the solid electrolyte and the ionic liquid (so electrolyte in the case of sample S12), to thereby yield an electrode complex powder. For the production of the cathode 116, the anode active material 216 predetermined for a corresponding sample was added to and mixed with the aforementioned mixture of the solid electrolyte and the ionic liquid (solid electrolyte in the case of sample S33), to thereby yield an electrode complex powder.

In the case of a sample containing a binder, 10 wt % PVDF-DM (dimethyl carbonate) solution was added dropwise (by small amount) to the aforementioned electrode complex powder, and the mixture was mixed by means of an agate mortar. The viscosity of the mixture was adjusted by adding DMC solvent small amount-by-small amount, to thereby prepare an electrode complex slurry. The slurry was applied, by means of an applicator, onto a metal foil uniformly stuck onto a glass substrate by use of DMC and a roller. The applied slurry was dried under reduced pressure at 80° C. for 10 hours, to thereby yield an electrode complex sheet.

Then, as shown in FIGS. 9 and 10, a MACOR tube was set in a short-axis member of the pressure jig 300. A separately prepared mixture (a material of the solid electrolyte layer) of the oxide-based lithium ion conductive solid electrolyte (LLZ-MgSr) and the ionic liquid (1.0M Li-FSI (EMI-FSI)) (150 mg) was put into the tube. Subsequently, a long-axis member was placed with respect to the MACOR tube, and the tube was pressed at 100 MPa. After pressing, the short-axis member was pulled out, and a material of an electrode (cathode 114 or anode 116); i.e., an electrode complex sheet punched out to have a diameter of 10 mm (or an electrode complex powder), was inserted. The short-axis member was set again in the MOCOR tube, and the laminate was pressed at 500 MPa. Then, the pressure jig was reversed, and the long-axis member was removed. A material of the counter electrode material; i.e., an In—Li foil piece punched out to have a diameter of 10 mm, and a Cu foil member punched out to have a diameter of 10 mm were sequentially inserted. The long-axis member was set again with respect to the MACOR tube, and the laminate was pressed at 80 MPa, Finally, a fixing jig (collar) was fixed, and the laminate was fastened by means of bolts at 8 N.

In this state, discharge of a battery was conducted at a current density of 50 µA/cm² and a cut-off voltage of 2.0 to 3.9 V (in the case where NCM was used as the cathode active material 214 of the cathode 114 sample), 2.0 to 3.7 V (in the case where NCA or LCO was used as the cathode active material 214 of the cathode 114 sample), and −0.6 to 1.0 V (samples of the cathode 116), and the initial discharge capacity was measured at 25° C. In evaluation of the cathode 114, a discharge capacity smaller than 50 µAh was rated as "X" (failure), a discharge capacity of 50 µAh or greater and smaller than 400 µAh as "O" (good), and a discharge capacity of 400 µAh or greater as "OO" (excellent). In evaluation of the anode 116, a discharge capacity smaller than 100 µAh was rated as "X" (failure), a discharge capacity of 100 µAh or greater and smaller than 400 µAh as "O" (good), and a discharge capacity of 400 µAh or greater as "OO" (excellent).

As shown in FIGS. 5 and 6, in evaluation of the cathode 114, the sample S12 containing no ionic liquid 224 exhibited a discharge capacity smaller than 50 µAh and was rated as failure (X). Conceivably, since the sample S12 contained no ionic liquid 224, particles of the oxide-based lithium ion conductive solid electrolyte 204 were in point contact with one another, whereby interparticle electrical resistance increased. As a result, conceivably, lithium ion conductivity in the electrode and at the interface between the electrode and another member decreased, thereby reducing the capacity of the battery.

In contrast, the samples S1 to S11 (except for the sample S6) each containing the ionic liquid 224 exhibited a discharge capacity of 50 µAh or greater and were rated as good (O) or excellent (OO). Conceivably, since these samples contained the ionic liquid 224, the ionic liquid 224 serving as lithium ion conduction paths was present at the particle boundaries of the oxide-based lithium ion conductive solid electrolyte 204, to thereby enhance the lithium ion conductivity at the particle boundary, or further in the electrode and at the interface between any of the electrodes and another member, leading to an enhancement in battery capacity. Based on the results, it is concluded that when the cathode 114 contains the oxide-based lithium ion conductive solid electrolyte 204, the cathode active material 214, and the ionic liquid 224, lithium ion conductivity in the electrode and at the interface between the electrode and another member can be enhanced.

The samples S7 to S11 exhibited a discharge capacity of 400 µAh or greater and were rated as excellent (OO). These samples had a cathode active material 214 content by volume of 40 vol % or more and 85 vol % or less, an oxide-based lithium ion conductive solid electrolyte 204 content by volume of 5 vol % or more and 40 vol % or less, and an ionic liquid 224 content by volume of 3 vol % or more and 35 vol % or less. In contrast, the sample S6 caused leakage of the ionic liquid during a molding process and was rated as "not measurable" (-). Based on the results, it is concluded that when the electrode satisfies the conditions of volume contents, lithium ion conductivity in the electrode and at the interface between the electrode and another member can be effectively enhanced, while leakage of the ionic liquid is suppressed.

As shown in FIGS. 7 and 8, in evaluation of the anode 116, the sample S33 containing no ionic liquid 226 exhibited a discharge capacity smaller than 100 µAh and was rated as failure (X). Conceivably, since the sample S33 contained no ionic liquid 226, particles of the oxide-based lithium ion conductive solid electrolyte 206 were in point contact with one another, whereby interparticle electrical resistance increased. As a result, conceivably, lithium ion conductivity in the electrode and at the interface between the electrode and another member decreased, thereby reducing the capacity of the battery.

In contrast, the samples S21 to S32 (except for the sample S26) each containing the ionic liquid 226 exhibited a discharge capacity of 100 µAh or greater and were rated as good (O) or excellent (OO). Conceivably, since these samples contained the ionic liquid 226, the ionic liquid 226 serving as lithium ion conduction paths was present at the particle boundaries of the oxide-based lithium ion conductive solid electrolyte 206, to thereby enhance the lithium ion conductivity at the particle boundary, or further in the electrode and at the interface between any of the electrodes and another member, leading to an enhancement in battery capacity. Based on the results, it is concluded that when the anode 116 contains the oxide-based lithium ion conductive solid electrolyte 206, the anode active material 216, and the ionic liquid 226, lithium ion conductivity in the electrode and at the interface between the electrode and another member can be enhanced.

The samples S27 to S32 exhibited a discharge capacity of 400 µAh or greater and were rated as excellent (OO). These samples had an anode active material 216 content by volume of 40 vol % or more and 85 vol % or less, an oxide-based lithium ion conductive solid electrolyte 206 content by volume of 5 vol % or more and 40 vol % or less, and an ionic liquid 226 content by volume of 3 vol % or more and 35 vol % or less. In contrast, the sample S26 caused leakage of the ionic liquid during a molding process and was rated as "not measurable" (-). Based on the results, it is concluded that when the electrode satisfies the conditions of volume contents, lithium ion conductivity in the electrode and at the interface between the electrode and another member can be effectively enhanced, while leakage of the ionic liquid is suppressed.

A-7. Preferred Embodiment of LLZ Ion Conductive Powder

As described above, the lithium ion conductor of the present embodiment contains an LLZ ion conductive powder (ion conductive solid electrolyte powder having a garnet-type crystal structure containing at least Li, La, Zr, and O). A preferably employed LLZ ion conductive powder contains at least one element selected from the group consisting of Mg, Al, Si, Ca (calcium), Ti, V (vanadium), Ga (gallium), Sr, Y (yttrium), Nb (niobium), Sn (tin), Sb (antimony), Ba (barium), Hf (hafnium), Ta (tantalum), W (tungsten), Bi (bismuth), and lanthanoids. The LLZ ion conductive powder having such a composition exhibits good lithium ion conductivity.

Also, a preferably employed LLZ ion conductive powder contains at least one of Mg and element A (wherein A represents at least one element selected from the group consisting of Ca, Sr, and Ba), wherein these elements satisfy the following mole ratio conditions (1) to (3). Mg and element A are available from relatively large reserves in the earth and inexpensive. Thus, when Mg and/or element A is used as a substitution element for the LLZ ion conductive powder, the LLZ ion conductive powder is expected to be reliably supplied and produced at low cost.

$$1.33 \leq Li/(La+A) \leq 3; \quad (1)$$

$$0 \leq Mg/(La+A) \leq 0.5; \text{ and} \quad (2)$$

$$0 \leq A/(La+A) \leq 0.67. \quad (3)$$

Further, a more preferably employed LLZ ion conductive powder contains both Mg and element A, wherein these elements satisfy the following mole ratio conditions (1') to (3'):

$$2.0 \leq Li/(La+A) \leq 2.5; \quad (1')$$

$$0.01 \leq Mg/(La+A) \leq 0.14; \text{ and} \quad (2')$$

$$0.04 \leq A/(La+A) \leq 0.17. \quad (3')$$

In other words, the LLZ ion conductive powder preferably satisfies any of the following (a) to (c), more preferably (c), still more preferably (d).

(a) The LLZ ion conductive powder contains Mg, wherein the amounts of the elements satisfy the mole ratio conditions: $1.33 \leq Li/La \leq 3$ and $0 \leq Mg/La \leq 0.5$.

(b) The LLZ ion conductive powder contains element A, wherein the amounts of the elements satisfy the mole ratio conditions: $1.33 \leq Li/(La+A) \leq 3$ and $0 \leq A/(La+A) \leq 0.67$.

(c) The LLZ ion conductive powder contains Mg and element A, wherein the amounts of the elements satisfy the mole ratio conditions: $1.33 \leq Li/(La+A) \leq 3$, $0 \leq Mg/(La+A) \leq 0.5$, and $0 \leq A/(La+A) \leq 0.67$.

(d) The LLZ ion conductive powder contains Mg and element A, wherein the amounts of the elements satisfy the mole ratio conditions: $2.0 \leq Li/(La+A) \leq 2.5$, $0.01 \leq Mg/(La+A) \leq 0.14$, and $0.04 \leq A/(La+A) \leq 0.17$.

When the LLZ ion conductive powder satisfies the aforementioned (a); i.e., when the LLZ ion conductive powder contains Li, La, Zr, and Mg so as to satisfy the aforementioned mole ratio conditions: (1) and (2), the LLZ ion conductive powder exhibits good lithium ion conductivity. Although the mechanism therefor has not clearly been elucidated, a conceivable reason is as follows. In the case where, for example, the LLZ ion conductive powder contains Mg, the ionic radius of Li is almost equivalent to that of Mg, and thus Mg is readily placed in Li sites where Li is originally present in the LLZ crystal phases. When Mg replaces Li, pores are provided at some Li sites in the crystal structure, due to the difference in amount of electric charge between Li and Mg, thereby conceivably enhancing the mobility of Li ions. As a result, lithium ion conductivity may be improved. In the LLZ ion conductive powder, when the mole ratio of Li to the sum of La and element A is smaller than 1.33 or greater than 3, a metal oxide other than the ion conductive powder having a garnet-type crystal structure is readily formed. An increase in the metal oxide content leads to a relative decrease in the amount of the ion conductive powder having a garnet-type crystal structure. Since the metal oxide has low lithium ion conductivity, the lithium ion conductivity of the LLZ ion conductive powder is reduced. An increase in the Mg content of the LLZ ion conductive powder leads to placement of Mg in Li sites and generation of pores at some Li sites, resulting in an improvement in lithium ion conductivity. When the mole ratio of Mg to the sum of La and element A is in excess of 0.5, an Mg-containing metal oxide is readily formed. An increase in the Mg-containing metal oxide content leads to a relative decrease in the amount of the ion conductive powder having a garnet-type crystal structure. The Mg-containing metal oxide has low lithium ion conductivity. Thus, when the mole ratio of Mg to the sum of La and element A is in excess of 0.5, the lithium ion conductivity of the LLZ ion conductive powder is reduced.

When the LLZ ion conductive powder satisfies the aforementioned (b); i.e., when the LLZ ion conductive powder contains Li, La, Zr, and element A so as to satisfy the mole ratio conditions (1) and (3), the LLZ ion conductive powder exhibits good lithium ion conductivity. Although the mechanism therefor has not clearly been elucidated, a conceivable reason is as follows. In the case where, for example, the LLZ ion conductive powder contains element A, the ionic radius of La is almost equivalent to that of element A, and thus element A is readily placed in La sites where La is originally present in the LLZ crystal phases. When element A replaces La, the crystal lattice deforms, and free Li ions increase due to the difference in amount of electric charge between La and element A, thereby conceivably improving lithium ion conductivity. In the LLZ ion conductive powder, when the mole ratio of Li to the sum of La and element A is smaller than 1.33 or greater than 3, a metal oxide other than the ion conductive powder having a garnet-type crystal structure is readily formed. An increase in the metal oxide content leads to a relative decrease in the amount of the ion conductive powder having a garnet-type crystal structure. Since the metal oxide has low lithium ion conductivity, the lithium ion conductivity of the LLZ ion conductive powder is reduced. An increase in the element A content of the LLZ ion conductive powder leads to placement of element A in La sites. As a result, the lattice deformation increases, and free Li ions increase due to the difference in amount of electric charge between La and element A, thereby improving lithium ion conductivity. When the mole ratio of element A to the sum of La and element A is in excess of 0.67, an element A-containing metal oxide is readily formed. An increase in the element A-containing metal oxide content leads to a relative decrease in the amount of the ion conductive powder having a garnet-type crystal structure. Since the element A-containing metal oxide has low lithium ion conductivity, the lithium ion conductivity of the LLZ ion conductive powder is reduced.

The aforementioned element A is at least one element selected from the group consisting of Ca, Sr, and Ba. Ca, Sr, and Ba are group 2 elements defined in the relevant periodic table, and readily form divalent cations. These elements have almost the same ionic radius. Since the ionic radius of each of Ca, Sr, and Ba is almost the same as that of La, La elements present in the La sites of the LLZ ion conductive powder are readily substituted with Ca, Sr, or Ba. Among these elements A, Sr is preferred, since the LLZ ion conductive powder containing Sr can be readily formed through sintering, to thereby achieve high lithium ion conductivity.

When the LLZ ion conductive powder satisfies the aforementioned (c); i.e., when the LLZ ion conductive powder contains Li, La, Zr, Mg, and element A so as to satisfy the mole ratio conditions (1) to (3), the ion conductive powder can be readily formed through sintering, to thereby achieve further improved lithium ion conductivity. When the LLZ ion conductive powder satisfies the aforementioned (d); i.e., when the LLZ ion conductive powder contains Li, La, Zr, Mg, and element A so as to satisfy the mole ratio conditions (1') to (3'), the lithium ion conductivity is further improved. Although the mechanism therefor has not clearly been elucidated, a conceivable reason is as follows. In the LLZ ion conductive powder, when, for example, Li in Li sites is substituted by Mg, and La in La sites is substituted by element A, pores are generated at some Li sites, and free Li ions increase. As a result, the lithium ion conductivity may be further improved. More preferably, the LLZ ion conductive powder contains Li, La, Zr, Mg, and Sr so as to satisfy the aforementioned conditions (1) to (3) (in particular (1') to (3')), since, in this case, the resultant lithium ion conductor has high lithium ion conductivity and high relative density.

Notably, in any of the aforementioned conditions (a) to (d), the LLZ ion conductive powder preferably contains Zr so as to satisfy the following mole ratio condition (4). When Zr is contained under the condition (4), an ion conductive powder having a garnet-type crystal structure can be readily produced.

$$0.33 \leq Zr/(La+A) \leq 1 \quad (4)$$

B. Modifications

The technique disclosed in the present specification is not limited to the aforementioned embodiment, but may be modified into various other forms without departing from the gist thereof. For example, the technique may be modified as described below.

In the aforementioned embodiment, the configuration of the complete-solid battery 102 is a mere example, and may be modified into various forms. For example, in the aforementioned embodiment, the cathode 114 and the anode 116 each contains an oxide-based lithium ion conductive solid electrolyte, an active material, and an ionic liquid. However, the cathode 114 and the anode 116 may further contain a component other than the above.

Also, in the aforementioned embodiment, both of the cathode 114 and the anode 116 each contain an oxide-based lithium ion conductive solid electrolyte, an active material, and an ionic liquid. However, only one of the cathode 114 and the anode 116 may have the above technical characteristic feature. In one possible example, the cathode 114 contains an ionic liquid, and the anode 116 contain no ionic liquid.

Notably, in the aforementioned embodiment, the materials corresponding to the elements of the complete-solid battery 102 are mere examples, and any element may be formed of another material. Further, in the aforementioned embodiment, the method for producing the complete-solid battery 102 is a mere example, and another production method may be employed.

The technique disclosed in the present specification is not limited to electrodes of the complete-solid battery 102, but can also be applied to electrodes of another power storage device (e.g., a lithium-air battery, a lithium flow battery, or a solid capacitor).

DESCRIPTION OF REFERENCE NUMERALS

102: complete-solid lithium ion secondary battery; 110: battery body; 112: solid electrolyte layer; 114: cathode; 116: anode; 154: cathode-side collector member; 156: anode-side collector member; 204, 206: oxide-based lithium ion conductive solid electrolyte; 214: cathode active material; 216: anode active material; 224, 226: ion liquid; and 300: pressure jig

The invention claimed is:

1. A power storage device electrode comprising:
   an oxide-based lithium ion conductive solid electrolyte;
   an active material;
   an ionic liquid; and
   a hydrocarbon, wherein
   the active material is selected from the group consisting of $LiFePO_4$, $Li(Co_{1/3}Ni_{1/3}Mn_{1/3})O_2$ and $LiNi_{0.8}Co_{0.15}Al_{0.05}O_2$.

2. The power storage device electrode according to claim 1, wherein
   the oxide-based lithium ion conductive solid electrolyte has a garnet-type crystal structure including at least Li, La, Zr, and O.

3. The power storage device electrode according to claim 1, wherein the active material consists of $LiNi_{0.7}Co_{0.15}Al_{0.05}O_2$.

4. A power storage device electrode comprising:
   an oxide-based lithium ion conductive solid electrolyte;
   an active material; and
   an ionic liquid, wherein
   the power storage device electrode contains;
   the active material in an amount by volume of 40 vol % or more and 85 vol % or less,
   the oxide-based lithium ion conductive solid electrolyte in an amount by volume of 5 vol % or more and 40 vol % or less, and
   the ionic liquid in an amount by volume of 3 vol % or more and 35 vol % or less.

5. The power storage device electrode according to claim 4, wherein
   the oxide-based lithium ion conductive solid electrolyte has a garnet-type crystal structure including at least Li, La, Zr, and O.

6. The power storage device electrode according to claim 4, wherein the oxide-based lithium ion conductive solid electrolyte is in the amount by volume of 20 vol % or more and 40 vol % or less.

7. A power storage device comprising:
   a solid electrolyte layer;
   a cathode;
   an anode; and
   a collector member, wherein
   at least one of the cathode and the anode is formed of the power storage device electrode as recited in claim 1.

8. A power storage device comprising:
   a solid electrolyte layer;
   a cathode;
   an anode; and
   a collector member, wherein
   at least one of the cathode and the anode is formed of the power storage device electrode as recited in claim 4.

* * * * *